(12) United States Patent
Burns

(10) Patent No.: US 9,606,364 B2
(45) Date of Patent: Mar. 28, 2017

(54) STABILIZING MOTION OF AN INTERACTION RAY

(71) Applicant: Microsoft Technology Licensing, LLC, Redmond, WA (US)

(72) Inventor: Aaron Burns, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 14/485,542

(22) Filed: Sep. 12, 2014

(65) Prior Publication Data

US 2016/0077344 A1 Mar. 17, 2016

(51) Int. Cl.
  *G02B 27/01* (2006.01)
  *G05B 15/02* (2006.01)
  *G06T 15/06* (2011.01)
  *G06T 15/10* (2011.01)
  (Continued)

(52) U.S. Cl.
  CPC ....... *G02B 27/0179* (2013.01); *G02B 27/017* (2013.01); *G05B 15/02* (2013.01); *G06F 3/012* (2013.01); *G06T 15/06* (2013.01); *G06T 15/10* (2013.01); *G06T 19/006* (2013.01); *G02B 2027/0174* (2013.01); *G02B 2027/0178* (2013.01); *G02B 2027/0187* (2013.01); *G06T 2200/04* (2013.01); *G06T 2200/24* (2013.01); *G06T 2207/10012* (2013.01); *G06T 2207/10021* (2013.01); *G06T 2219/2016* (2013.01)

(58) Field of Classification Search
  None
  See application file for complete search history.

(56) References Cited

U.S. PATENT DOCUMENTS

| 5,742,264 A | 4/1998 | Inagaki et al. |
| 8,188,968 B2 | 5/2012 | Marks |
| 8,503,737 B2 | 8/2013 | Oka et al. |

(Continued)

FOREIGN PATENT DOCUMENTS

EP 1147373 A1 10/2001

OTHER PUBLICATIONS

Jimenez, et al., "Gaze-Based Interaction for Virtual Environments", In Journal of Universal Computer Science, vol. 14, Issue 19, Retrieved on: Feb. 14, 2014, pp. 3087-3098.

(Continued)

*Primary Examiner* — Michelle Chin
(74) *Attorney, Agent, or Firm* — Vierra Magen Marcus LLP

(57) ABSTRACT

Technology for stabilizing an interaction ray based on variance in head rotation is disclosed. One aspect includes monitoring orientation of a person's head, which may include monitoring rotation about an axis of the head, such as recording an Euler angle with respect to rotation about an axis of the head. The logic determines a three-dimensional (3D) ray based on the orientation of the head. The 3D ray has a motion that precisely tracks the Euler angle over time. The logic generates an interaction ray that tracks the 3D ray to some extent. The logic determines a variance of the Euler angle over time. The logic stabilizes the interaction ray based on the variance of the Euler angle over time despite some rotation about the axis of the head. The amount of stabilizing may be inversely proportional to the variance of the Euler angle.

20 Claims, 11 Drawing Sheets

(51) Int. Cl.
*G06T 19/00* (2011.01)
*G06F 3/01* (2006.01)

(56) References Cited

U.S. PATENT DOCUMENTS

2005/0057497 A1* 3/2005 Kawahara ............ G06F 3/04815
 345/157
2006/0019614 A1 1/2006 Yamasaki
2008/0211768 A1 9/2008 Breen et al.
2010/0315334 A1 12/2010 Choi et al.
2012/0050142 A1 3/2012 Border et al.

OTHER PUBLICATIONS

Argelaguet, et al., "Efficient 3D Pointing Selection in Cluttered Virtual Environments", In Journal of IEEE Computer Graphics and Applications, vol. 29, Issue 6, Nov. 2009, 7 pages.
Teather, et al., "Pointing at 3D Targets in a Stereo Head-Tracked Virtual Environment", In Proceedings of IEEE Symposium on 3D User Interfaces, Mar. 19, 2011, 8 pages.
Tanriverdi, et al., "Interacting With Eye Movements in Virtual Environments", In Proceedings of the SIGCHI Conference on Human Factors in Computing Systems, Apr. 1, 2000, 8 pages.
Grossman, et al., "The Design and Evaluation of Selection Techniques for 3D Volumetric Displays", In Proceedings of the 19th Annual ACM Symposium on User Interface Software and Technology, Oct. 15, 2006, pp. 3-12.
Duval, et al., "An asymmetric 2D Pointer / 3D Ray for 3D Interaction within Collaborative Virtual Environments", In Proceedings of the 14th International Conference on 3D Web Technology, Jun. 16, 2009, pp. 33-41.
Kunert, et al., "Facilitating System Control in Ray-based Interaction Tasks", In Proceedings of the 16th ACM Symposium on Virtual Reality Software and Technology, Nov. 18, 2009, pp. 183-186.
U.S. Appl. No. 13/172,633, filed Jun. 29, 2011.
International Search Report & the Written Opinion of the International Searching Authority dated Dec. 14, 2015, International Application No. PCT/US2015/049052.
Written Opinion of the International Preliminary Examining Authority dated Aug. 29, 2016, International Application No. PCT/US2015/049052.
Amendment under Article 34 dated Jul. 1, 2016, International Application No. PCT/US2015/049052.

* cited by examiner

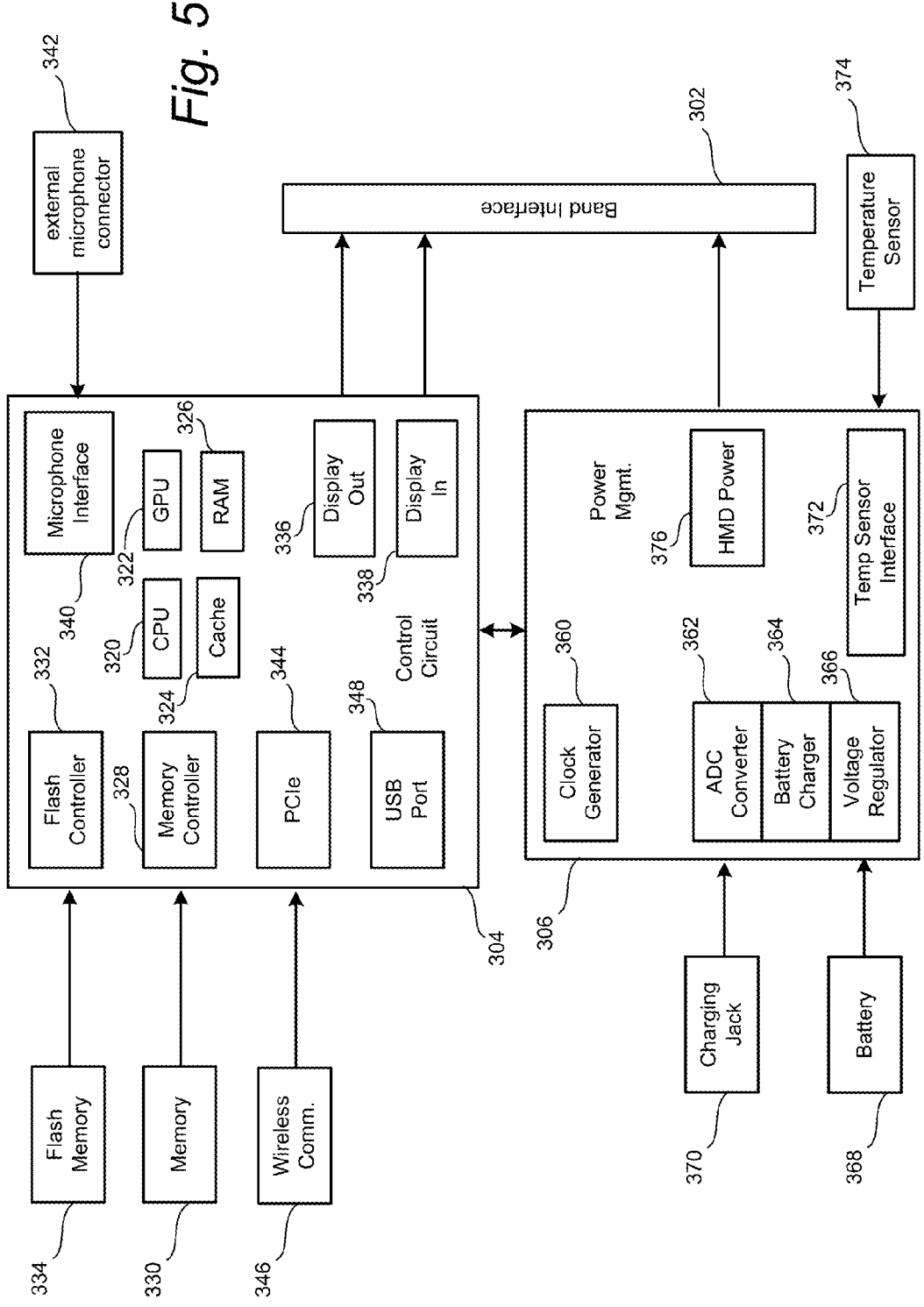

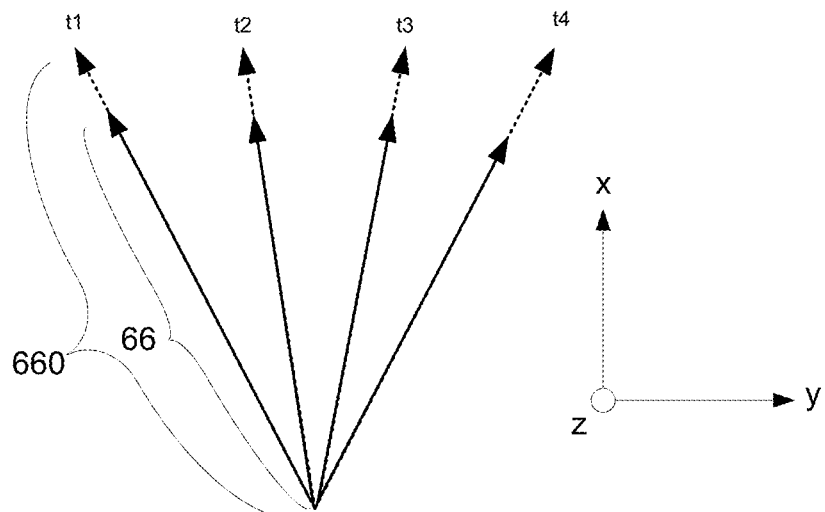
*Fig. 6A*
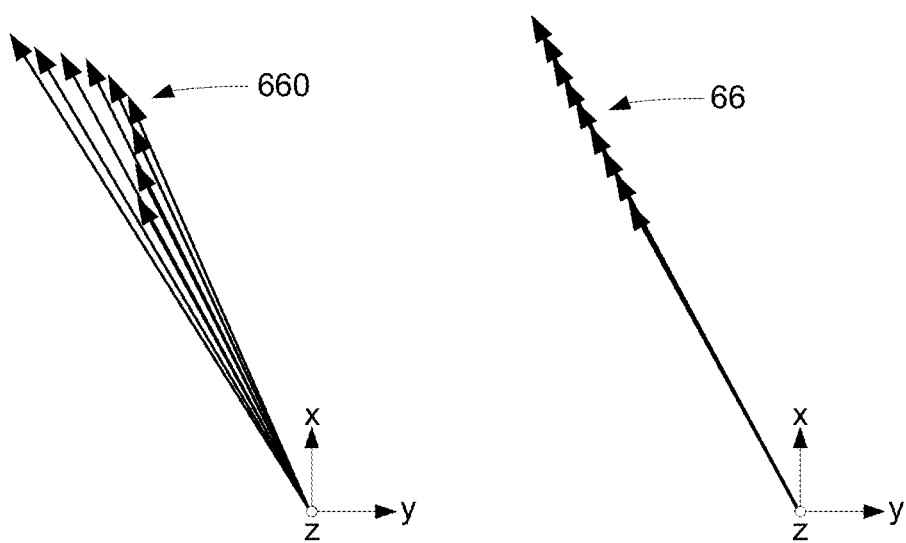
*Fig. 6B*   *Fig. 6C*

STABILIZING MOTION OF AN INTERACTION RAY

BACKGROUND

Numerous techniques have been suggested for allowing a user to point or a select when using an electronic device. For example, a user can control a cursor on a display screen to select, scroll, etc. Such cursors could be controlled by a computer mouse, a trackball, a touchpad etc. Some devices have touchscreens for user input. More recently, techniques that employ eye tracking or head tracking have been suggested to allow user input, selection, etc.

SUMMARY

Embodiments of the present technology relate to a system, device, and method for stabilizing an interaction ray based on variance in angle of head rotation.

One embodiment includes an apparatus having a sensor and logic that monitors orientation of a person's head using the sensor. This monitoring may include monitoring rotation about an axis of the head, such as recording an Euler angle with respect to rotation about the axis of the head. The logic determines a three-dimensional (3D) ray based on the orientation of the head. The 3D ray has a motion that precisely tracks the Euler angle over time. The logic generates an interaction ray that tracks the 3D ray to some extent. The logic determines a variance of the Euler angle over time. The logic stabilizes the interaction ray based on the variance of the Euler angle over time despite some rotation about the axis of the head. The amount of stabilizing is inversely proportional to the variance of the Euler angle. The logic determines a collision of the second 3D ray with a 3D coordinate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a block diagram of one embodiment of the components of a processing unit associated with a head mounted display unit.

FIG. 6A shows a 3D ray and an interaction ray for several points in time in which the interaction ray closely tracks the 3D ray.

FIGS. 6B and 6C show 3D rays for an example in which variance of rotation about an axis is low and the interaction ray is stable.

DETAILED DESCRIPTION

Embodiments disclosed herein provide for an interaction ray that can be used as a selector or pointer. For example, a user that is wearing a head mounted display (HMD) may use the interaction ray to make a selection of an element being presented in the HMD. The user may control the interaction ray by orientation of their head. The interaction ray may be a 3D vector that originates from the user's head. Note that the interaction ray is not necessarily a visible ray. The interaction ray serves as a type of cursor in one embodiment. As a particular example, the user may be reading a newspaper article being presented in the HMD. The interaction ray could allow the user to select or point to an element such as a hyperlink in the article.

It could potentially be difficult for the user to control the location of the interaction ray. However, embodiments disclosed herein control motion of a 3D ray that is calculated based on orientation of the user's head in a way that allows precise control of the interaction ray. In one embodiment, a high degree of stabilizing of the interaction ray is provided when variance of head motion is low. This means that small head movements are in effect stabilized, which provides more precise control of the interaction ray. However, little or no stabilizing of the interaction ray is provided when variance of head motion is high. For example, if the user is moving their head from right to left, little stabilizing of the interaction ray is provided. This makes the interaction ray more responsive to head motion, which means that the interaction ray tracks the actual orientation of the user's head more closely.

Figure 1A:
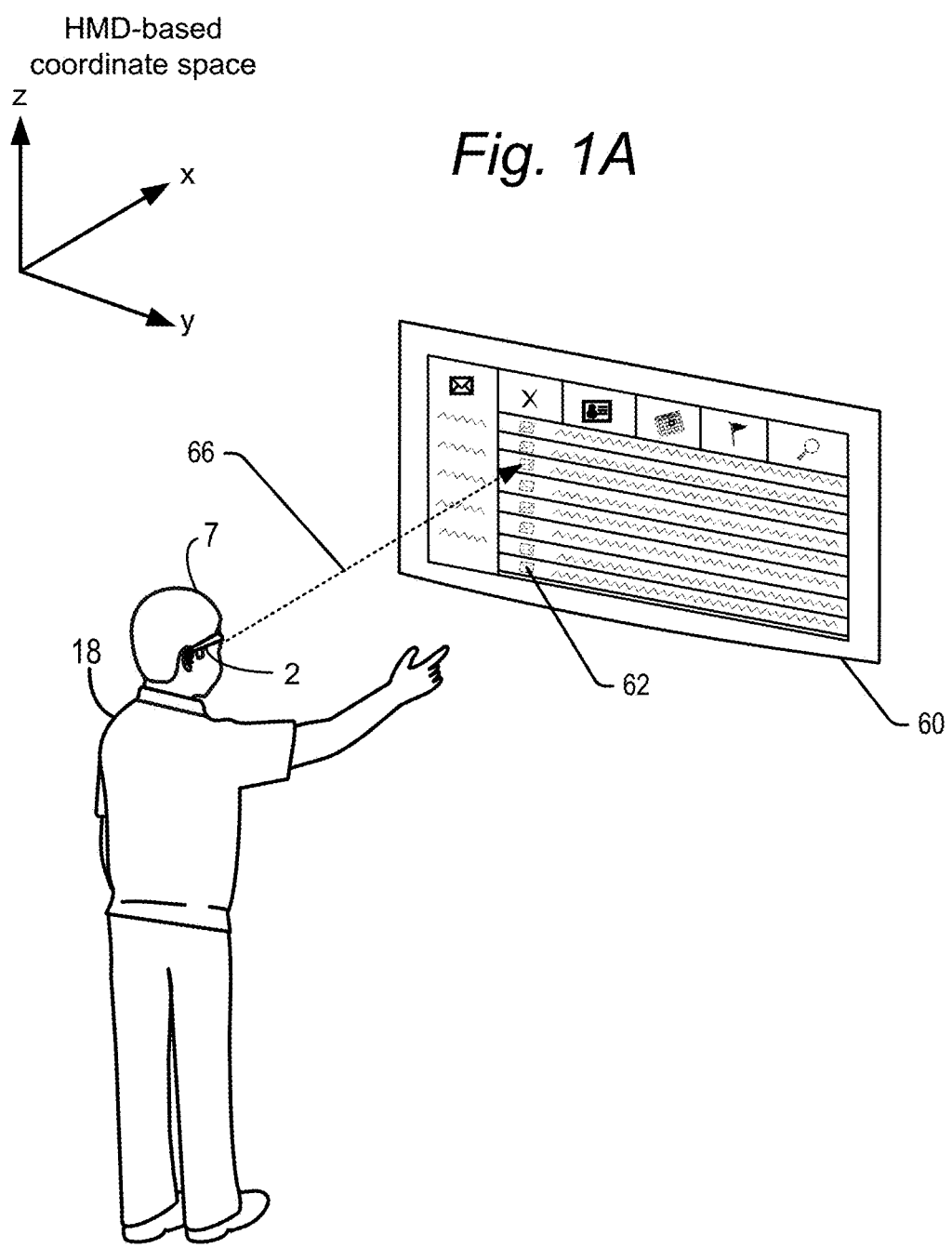
FIG. 1A is an example environment in which embodiments of controlling motion of an interaction ray may be practiced.

FIG. 1A shows an example of a user 18 interacting with a virtual image 60 by use of an interaction ray 66. The user 18 is wearing an HMD 2, which is displaying the virtual image 60. Thus, the location of the virtual image 60 in FIG. 1A is meant to represent the illusion that the user gets that the virtual image 60 is located somewhere in front of the user 18. This may be referred to as the field of view of the HMD 2. In this example, the virtual image 60 may stay relatively fixed as the user 18 moves their head 7 and/or eyes. Thus, the user can easily shift their attention to a different location in the virtual image 60 without causing the virtual image 60 to shift. The virtual image 60 could be contain content such as a virtual newspaper, as one example.

The interaction ray 66 originates from a point at or near the user's head 7, such as midway between the eyes, in this example. The interaction ray 66 may be a 3D vector. The interaction ray 66 does not need to be shown in the HMD 2, but that is one possibility. The user 18 may move their head 7 to cause the interaction ray 66 to move. For example, as the user 18 moves his head 7 from right to left, the interaction ray 66 tracks the orientation of the head 7.

One possible use of the interaction ray 66 is as a cursor. For example, the virtual image 60 could have some selectable elements 62, which might be links to other content. The user 18 might select one of the selectable elements 62 by positioning their head such that the interaction ray 66 is pointing at the desired selectable element 62. As noted, the interaction ray 66 itself does not need to be visibly present in the display. The HMD 2 might highlight the element 62 presently being pointed to by the interaction ray. The user 18 might select the element 62 in a number of ways such as a voice command, tapping a button or some physical contact on the HMD 2, etc.

As noted above, one of the challenges of the interaction ray 66 is that the user could potentially have a difficult time precisely controlling the location of the interaction ray. For example, slight head movements could potentially cause undesired movements of the interaction ray 66. Embodiments stabilize the interaction ray 66 that is created based on movement of the user's head 7 in a way to provide better control over the interaction ray 66. In one embodiment, the stabilizing of the interaction ray 66 is inversely proportional to the variance of head rotation. Further details of this will be discussed below.

FIG. 1A shows one possible HMD-based coordinate system. The origin of the HMD-based coordinate system is somewhere near the middle of the user's head 7 in one embodiment. Another location for the origin is possible. Thus, the location of the origin of the HMD-based coordinate system that is depicted in FIG. 1A should be understood to be for the sake of ease of illustration. The origin is not limited to the depicted location. In one embodiment, the origin of the HMD-based coordinate system moves as the user moves their head 7, such that the HMD-based coordinate system stays fixed relative to the position of the HMD 2. For example, as the user's head translates laterally, the origin of the HMD-based coordinate system may translate an equal amount. However, rotations of the user's head about one of the axes do not move the HMD-based coordinate system, in one embodiment. For example, when the user moves their head from right to left (such that their head rotates about the z-axis) the head movement can be measured relative to the HMD-based coordinate system in terms of angles of rotation with respect to the z-axis. Note that translations of the user's head may also be taken into consideration.

In one embodiment, one or more Euler angles are tracked. Euler angles may represent rotations about the axes of a coordinate system. For example, the angles may represent a rotation about the x-axis by an angle α, a rotation about the y-axis by an angle β, and a rotation about z-axis, by an angle γ. For example, one or more of pitch (y-axis), yaw (z-axis) and/or roll (x-axis) could be tracked.

Figure 1B:
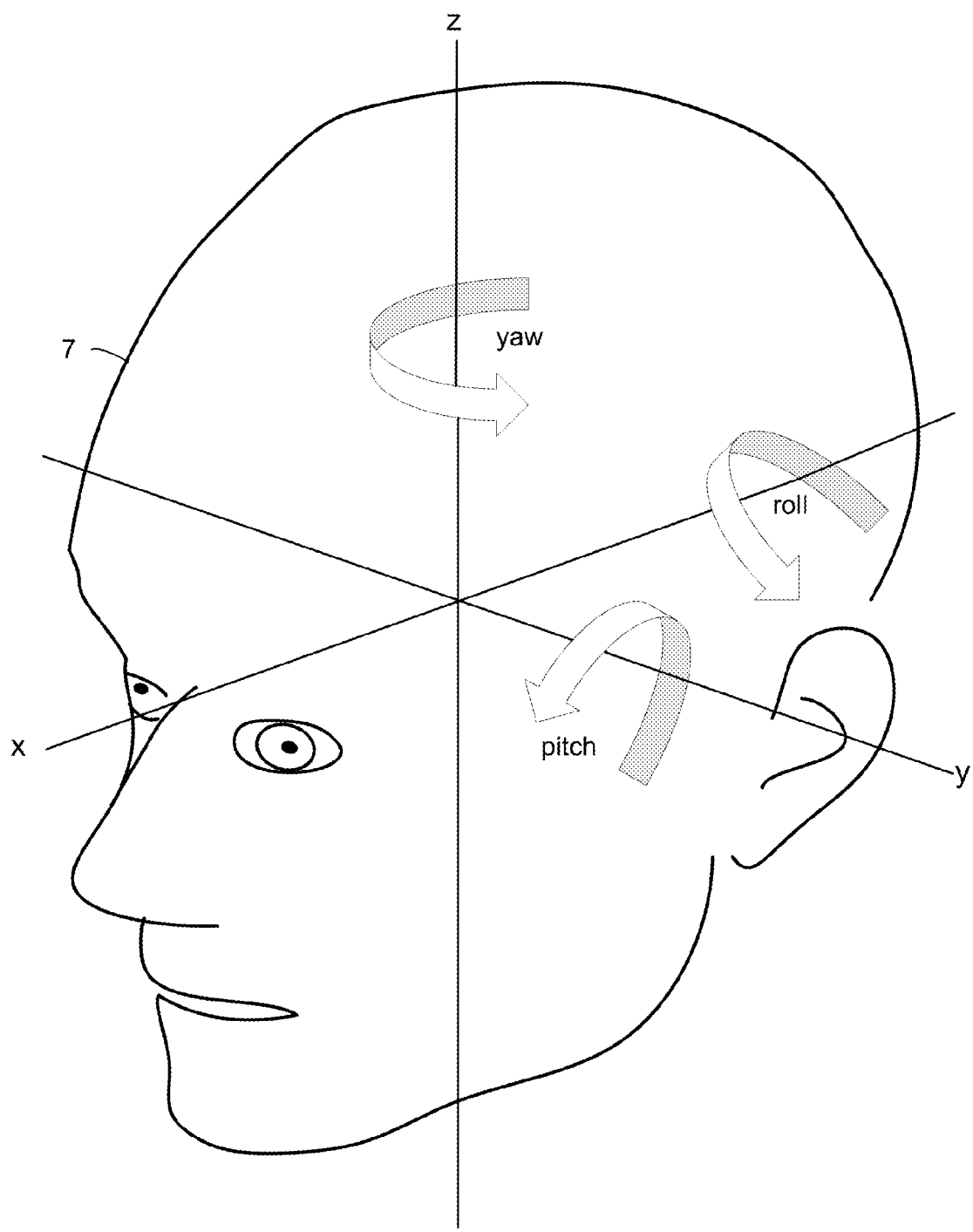
FIG. 1B is a diagram of a person's head to help illustrate an embodiment that monitors pitch, roll, and yaw.

FIG. 1B is a diagram of a person's head to help illustrate an embodiment that monitors pitch, roll, and yaw. An example z-axis, y-axis, and x-axis with respect to the person's head 7. This coordinate system has an origin somewhere in the person's head 7. Note that this may be the same coordinate system as the HMD-based coordinate system from FIG. 1A.

The y-axis in FIG. 1B roughly corresponds to a line between the person's ears. The x-axis in FIG. 1B roughly corresponds to a line from a point between the person's eyes to out through the back of the head. The z-axis in FIG. 1B roughly corresponds to a line from the center of the head upwards through the top of the head. These axes are shown for the sake of one example.

The following is an example usage scenario. A user may be sitting still, interacting with a horizontally laid out menu being presented in an HMD 2. The variance of the head position may be low since the person is stationary. Therefore, subtle translation effects may be stabilized in one embodiment. The variance in pitch may be very low since the person may be looking left to right, but not up and down. Therefore, a high degree of stabilizing may be applied so the interaction ray will not move up and down on the page. The volatility in yaw may be high since the person is rotating their head with respect to the z-axis as they look along the list. Therefore, the stabilizing with respect to the z-axis rotation may be low to allow the interaction ray 66 to closely track this left to right movement of the person's head. However, if the user slows their left to right (yaw) motion as they close in on a menu item of interest, the variance drops. In response, the amount of the stabilization of the interaction ray 66 may be increased, allowing more precise selection.

Because the user might not know their head direction and orientation precisely, it can be difficult for the user to precisely control to interaction ray 66. However, embodiments stabilize the interaction ray 66 and as such provide higher fidelity in refined motion.

Figure 1C:
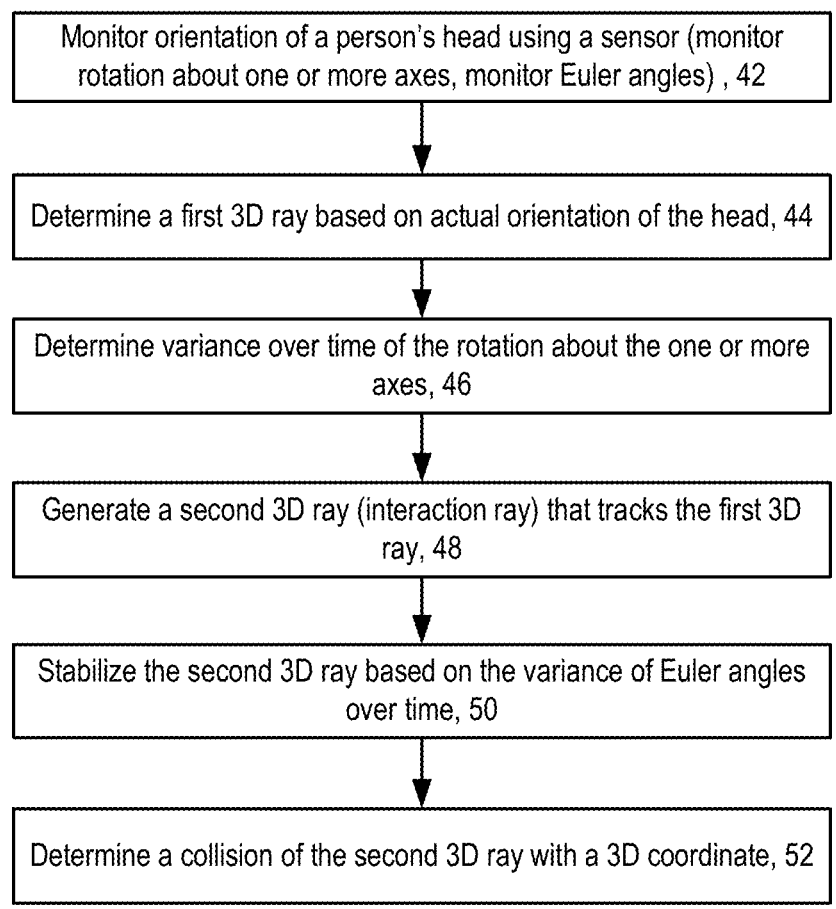
FIG. 1C is a flowchart of one embodiment of a process of controlling motion in an interaction ray.

FIG. 1C is a flowchart of one embodiment of a process of stabilizing motion of an interaction ray 66. The process can be practiced in an environment such as the one of FIG. 1A, but that is just one example. The process is performed by logic in an HMD 2, in one embodiment. The logic could be a processor that executes processor readable instructions, hardware such as an application specific circuit (ASIC), System-on-a-Chip systems (SoCs), etc. Thus, the process can be performed by software (e.g., instructions that are stored on a storage device and executed by a processor), hardware, or some combination of software and hardware.

In step 42, the orientation of a person's head is tracked using a sensor. Step 42 may include tracking rotation about one or more axes of the head. The three axes are an x-, y-, and z-axis in one embodiment. In one embodiment, one or more Euler angles are tracked. Euler angles may represent rotations about the axes of a coordinate system. For example, the angles may represent a rotation about the x-axis by an angle α, a rotation about the y-axis by an angle β, and a rotation about z-axis, by an angle γ. For example, one or more of pitch (y-axis), yaw (z-axis) and/or roll (x-axis) could be tracked.

In step 44, a first 3D ray is determined based on actual orientation of the head. In one embodiment, the origin of this first 3D ray is at or near the user's head. For example, the origin may be midway between the user's eyes. The origin could be the same as the origin of the HMD-based coordinate system. This first 3D ray may extend outward in a direction in which the user is looking. However, it is not required that eye tracking be used. Rather, the direction of the first 3D ray may be determined entirely on the orientation of the user's head, in one embodiment.

This first 3D ray may be the direct result of the rotation about the one or more axis. For example, rotation about the z-axis of the head may directly result in a first component of motion of the first 3D vector. Likewise, rotation about the y-axis of the head may directly result in a second component of motion of the first 3D vector. Furthermore, rotation about the x-axis of the head may directly result in a third component of motion of the first 3D vector.

The first 3D ray may track the Euler angle over time. Note that this may be a precise or faithful tracking in that direction of the first 3D ray may exactly correspond to whatever Euler angles are being monitored. One, two, or three Euler angles may be monitored. In one embodiment, the first 3D ray is simply the x-axis. In this case, the movement of the first 3D ray depends on pitch and yaw, but does not necessarily depend on roll. However, a roll component could be added to the first 3D vector if desired.

The first 3D ray may be determined using sensors on an HMD 2. This sensors could include cameras, accelerometers, etc. In one embodiment, image data is analyzed to determine both the user head position and a face unit vector looking straight out from a user's face. The face unit vector may be determined by defining a plane of the user's face, and taking a vector perpendicular to that plane. This plane may be identified by determining a position of a user's eyes, nose, mouth, ears or other facial features.

In step 46, a variance of the rotation about the one or more axes of the person's head is determined. The variance refers to the variance of the Euler angle referred to in step 42 over time, in one embodiment. Note that the variance does not necessarily refer to a strict definition of the mathematical term "variance". However, one possibility is for the variance, as the term as used herein, to refer to the mathematical term variance. Thus the term, "variance" as used herein with respect to the variance in the Euler angle, pitch, roll, yaw, etc. includes, but is not limited to, the mathematical term "variance."

In step 48, a second 3D ray is generated based on the first 3D ray. This second 3D ray may also be referred to as an interaction ray 66. Generating the second 3D ray may include determining an origin and a direction for the second 3D ray. In other words, a 3D vector may be determined. The origin of the second 3D may be the same as the origin of the first 3D vector. However, the direction may not exactly coincide with that of the first 3D vector. This can help to stabilize the interaction ray 66 to allow for better user control of the interaction ray 66.

Note that the interaction ray 66 may track the first 3D ray, but this is not necessarily a precise tracking. Stated another way, the interaction ray 66 may track the first 3D ray to some extent. In one embodiment, the system alters how closely the interaction ray 66 tracks the first 3D ray based on the variance of the Euler angle over time. The closeness of the tracking may be proportional to the variance of the Euler angle over a recent time period. In one embodiment, the system stabilizes the interaction ray 66 based on the variance of the Euler angle over time. The amount of stabilizing may be inversely proportional to the variance of the Euler angle over a recent time period. Further details are discussed below.

In step 50, the interaction ray 66 is stabilized based on the variance of the first 3D ray. The stabilizing is inversely proportional to the variance of the Euler angle over a recent time period, in one embodiment. For example, if the user is moving their head slowly, this should result in low variance in angle of rotation of their head about an axis that may be roughly in line with their spine. For low variance, high stabilizing may be applied to the motion of the interaction ray 66. This results in the interaction ray 66 being stable despite some motion of the first 3D ray. Referring to the example of FIG. 1A, this helps the user to keep the interaction ray 66 stable despite small head movements due to, for example, breathing, etc.

However, for high variance of the Euler angle over a recent time period, low or no stabilizing would be applied to the motion of the interaction ray, for one embodiment. This may result in the interaction ray 66 tracking the first 3D ray very closely (possibly identically). Referring to the example of FIG. 1A, if the user were to move their head from left to right, the interaction ray 66 may move without delay. This can help the interaction ray 66 to be highly responsive.

Note that when variance is determined for more than one axis, a separate stabilizing factor may be used in connection with rotation about each axis. For example, a separate stabilizing factor may be determined for one, two, or all three of the components of motion of the first 3D vector discussed above.

In step 52, a collision between the second 3D ray (or interaction ray) and a 3D coordinate is determined. The 3D coordinate is a real world coordinate, in one embodiment. In the example of FIG. 1A, the interaction ray 66 is depicted as colliding with one of the selectable elements 62. Thus, the system may detect an element 62 or some portion of the image 60 with which the interaction ray 66 collides. Here, "collides" is referring to the fact that the second 3D ray may be considered to occupy various points in 3D space. The 3D coordinate of the image 60 may be a 3D coordinate at which the image 60 appears to be. Note that mixed reality techniques are well known in the art, and may be one way of making the image 60 appear to be at some real world 3D coordinate. That is, in reality the image 60 may be physically presented on the HMD 2. However, the 3D coordinates of the HMD display are not necessarily the 3D coordinates being referred to in step 52.

The 3D coordinate (or multiple 3D coordinates) are not required to be associated with image 60 being presented in the HMD 2. For example, the 3D coordinates could be some point in the real world. Thus, the system could determine that the interaction ray 66 is pointed at some object in the real world.

In various embodiments, the user wears a head mounted display device including a display element. Next, an example HMD system will be discussed. The display element is to a degree transparent so that a user can look through the display element at real world objects within the user's field of view (FOV). The display element also provides the ability to project virtual images into the FOV of the user such that the virtual images may also appear alongside the real world objects. In one embodiment, the system may automatically track where the user is looking so that the system can determine where to insert the virtual image in the FOV of the user. Once the system knows where to project the virtual image, the image is projected using the display element. In one embodiment, the system inserts the virtual image such that it appears to remain fixed at the same place in the real world. For example, the system can make it appear that a virtual newspaper remains in the same place as the user moves their head and/or eyes to read the virtual newspaper.

In embodiments, the system builds a model of the environment including the x, y, z Cartesian positions of the user, real world objects and virtual three-dimensional objects in the room or other environment. The positions of the head mounted display device worn by the user in the environment may be calibrated to the model of the environment. This allows the system to determine the user's line of sight and FOV of the environment. Note that a different coordinate system may be used for the positions of the user, real world objects and virtual three-dimensional objects in the room or other environment than the previously mentioned HMD-based coordinate system. Appropriate translations can be made between the coordinate systems.

A user may choose to interact with one or more of the virtual objects appearing within the user's FOV. The interaction ray 66 allows the user to specify a virtual object. A variety of techniques can be used to allow the user to select the virtual object. A user may interact with virtual objects using verbal gestures, such as for example a spoken word or phrase recognized by the mixed reality system as a user request for the system to perform a predefined action. Verbal gestures may be used in conjunction with physical gestures to interact with one or more virtual objects in the mixed reality environment.

In accordance with the present technology, when multiple virtual objects are displayed, the present system determines which of the virtual objects the user is focused on. This may be based on the interaction ray 66. That virtual object is then available for interaction and the other virtual objects may, optionally, be deemphasized by various methods. The present technology uses various schemes for determining user focus. In one example, the system may receive a predefined selection gesture indicating that the user is selecting a given virtual object. Alternatively, the system may receive a predefined interaction gesture, where the user indicates a focus by interacting with a given virtual object. Both the selection gesture and the interaction gestures may be physical or verbal.

Embodiments are described below which identify user focus on a virtual object such as a virtual display slate presenting content to a user. The content may be any content which can be displayed on the virtual slate, including for example static content such as text and pictures or dynamic content such as video. However, it is understood that the present technology is not limited to identifying user focus on virtual display slates, and may identify user focus on any virtual objects with which a user may interact.

Figure 2:
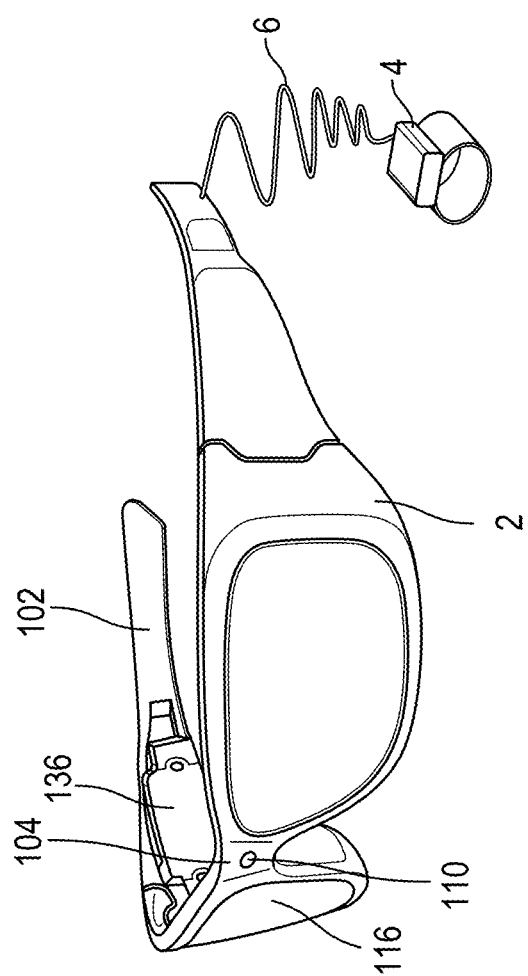
FIG. 2 is a perspective view of one embodiment of a head mounted display unit.

As seen in FIG. 2, the head mounted display device 2 is in communication with its own processing unit 4 via wire 6. In other embodiments, head mounted display device 2 communicates with processing unit 4 via wireless communication. Head mounted display device 2, which in one embodiment is in the shape of glasses, is worn on the head of a user so that the user can see through a display and thereby have an actual direct view of the space in front of the user. The use of the term "actual direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

In one embodiment, processing unit 4 is a small, portable device for example worn on the user's wrist or stored within a user's pocket. The processing unit may for example be the size and form factor of a cellular telephone, though it may be other shapes and sizes in further examples. The processing unit 4 may include much of the computing power used to operate head mounted display device 2. In embodiments, the processing unit 4 communicates wirelessly (e.g., WiFi, Bluetooth, infra-red, or other wireless communication means) to one or more hub computing systems 12.

Figure 3:
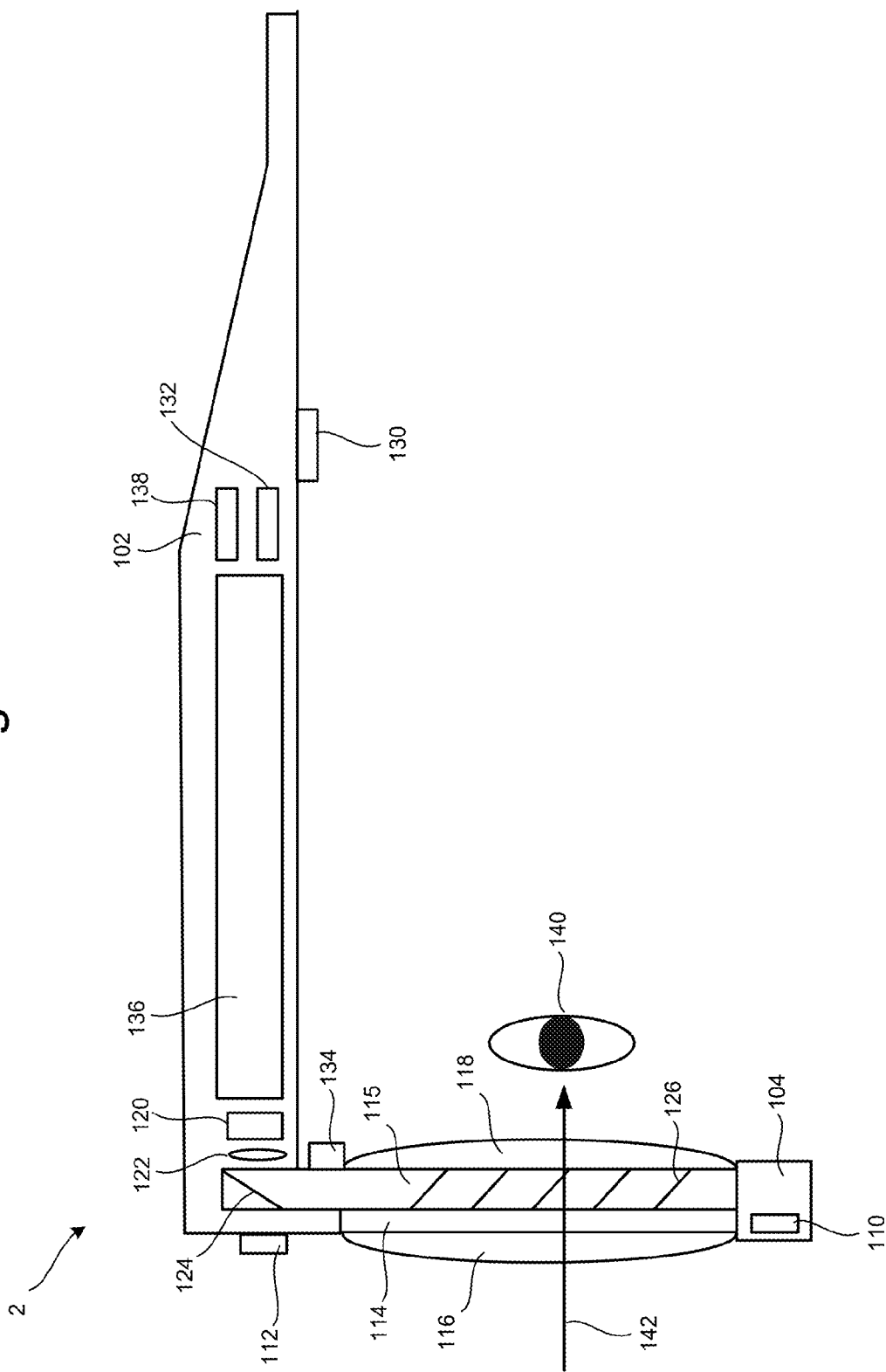
FIG. 3 is a side view of a portion of one embodiment of a head mounted display unit.

FIGS. 2 and 3 show perspective and side views of the head mounted display device 2. FIG. 3 shows the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include one see-through lens or no see-through lenses. In another alternative, a prescription lens can go inside light-guide optical element 115. Opacity filter 114 filters out natural light (either on a per pixel basis or uniformly) to enhance the contrast of the virtual imagery. Light-guide optical element 115 channels artificial light to the eye. More details of opacity filter 114 and light-guide optical element 115 are provided below.

Mounted to or inside temple 102 is an image source, which (in one embodiment) includes microdisplay 120 for projecting a virtual image and lens 122 for directing images from microdisplay 120 into light-guide optical element 115. In one embodiment, lens 122 is a collimating lens.

Control circuits 136 provide various electronics that support the other components of head mounted display device 2. More details of control circuits 136 are provided below with respect to FIG. 4. Inside or mounted to temple 102 are ear phones 130, inertial measurement unit 132 and temperature sensor 138. In one embodiment shown in FIG. 4, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations of head mounted display device 2. The inertial measurement unit 132 may sense pitch, roll and yaw (of the users' head, for example). The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCoS) and Mirasol® display technology from Qualcomm, Inc. are examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that one of the five surfaces is labeled 126 to prevent over-crowding of the drawing. Reflecting surfaces 126 couple the light waves incident upon those reflecting surfaces out of the substrate into the eye 140 of the user.

As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. In one embodiment, each eye will have its own light-guide optical element 115. When the head mounted display device 2 has two light-guide optical elements, each eye can have its own microdisplay 120 that can display the same image in both eyes or different images in the two eyes. In another embodiment, there can be one light-guide optical element which reflects light into both eyes.

Opacity filter 114, which is aligned with light-guide optical element 115, selectively blocks natural light, either uniformly or on a per-pixel basis, from passing through light-guide optical element 115. However, in general, an embodiment of the opacity filter 114 can be a see-through LCD panel, an electrochromic film, or similar device which is capable of serving as an opacity filter. Opacity filter 114 can include a dense grid of pixels, where the light transmissivity of each pixel is individually controllable between minimum and maximum transmissivities. While a transmissivity range of 0-100% is ideal, more limited ranges are also acceptable, such as for example about 50% to 90% per pixel, up to the resolution of the LCD.

A mask of alpha values can be used from a rendering pipeline, after z-buffering with proxies for real-world objects. When the system renders a scene for the augmented reality display, it takes note of which real-world objects are in front of which virtual objects as explained below. If a virtual object is in front of a real-world object, then the opacity may be on for the coverage area of the virtual object. If the virtual object is (virtually) behind a real-world object, then the opacity may be off, as well as any color for that pixel, so the user will see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide FOV.

Figure 4:
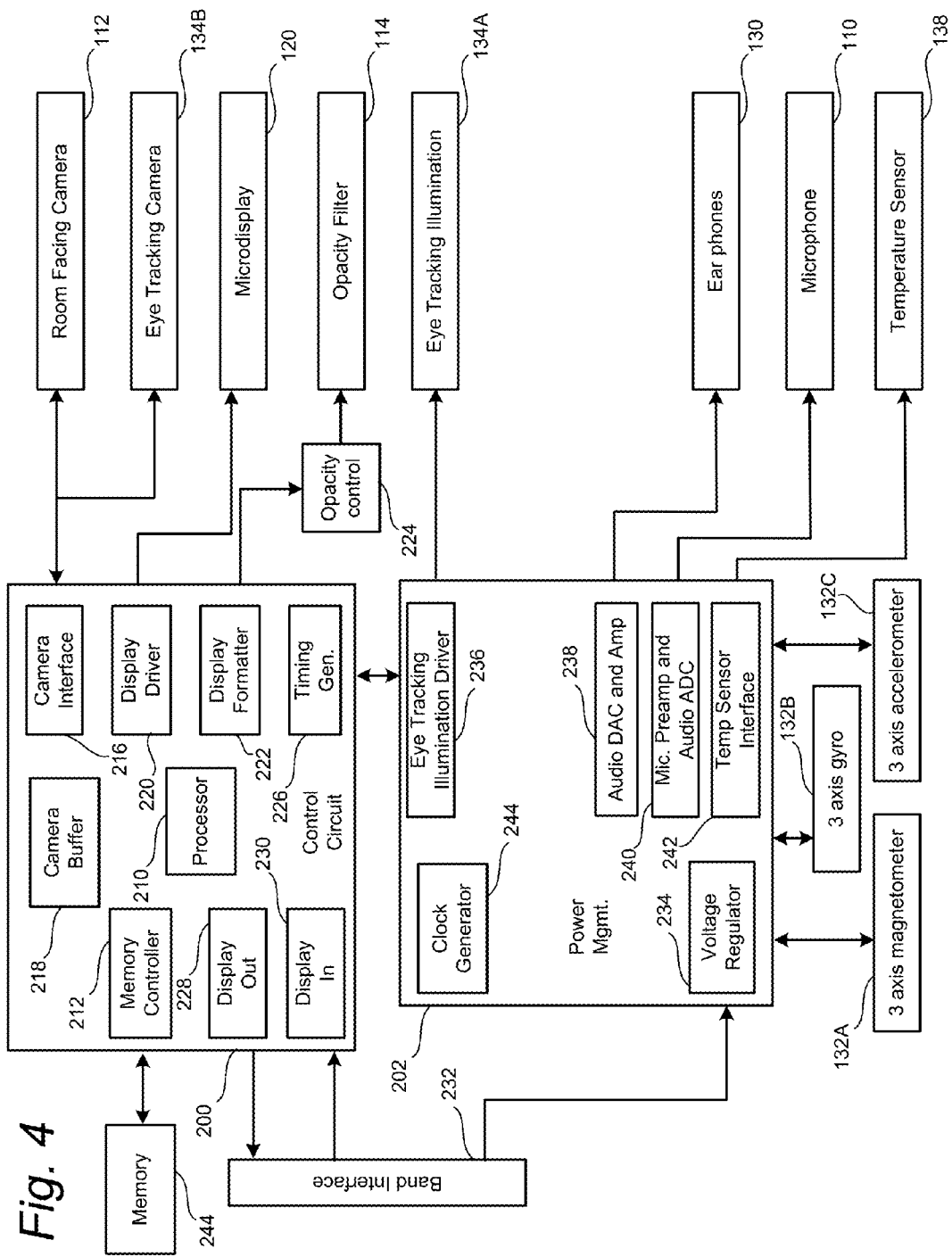
FIG. 4 is a block diagram of one embodiment of the components of a head mounted display unit.

Head mounted display device 2 also includes a system for tracking the position of the user's eyes. For example, head mounted display device 2 includes eye tracking assembly 134 (FIG. 3), which has an eye tracking illumination device 134A and eye tracking camera 134B (FIG. 4). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 3 shows one assembly with one IR transmitter, the structure of FIG. 3 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 3 shows half of the head mounted display device 2. A full head mounted display device would include another set of see-through lenses, another opacity filter, another light-guide optical element, another microdisplay 120, another lens 122, room-facing camera, eye tracking assembly, micro display, earphones, and temperature sensor.

FIG. 4 is a block diagram depicting the various components of head mounted display device 2. FIG. 5 is a block diagram describing the various components of processing unit 4. Head mounted display device 2, the components of which are depicted in FIG. 4, is used to provide a mixed reality experience to the user by fusing one or more virtual images seamlessly with the user's view of the real world.

Additionally, the head mounted display device components of FIG. 4 include many sensors that track various conditions. Head mounted display device 2 will receive instructions about the virtual image from processing unit 4 and will provide the sensor information back to processing unit 4. Processing unit 4, the components of which are depicted in FIG. 4, will receive the sensory information from head mounted display device 2. Based on that exchange of information and data, processing unit 4 will determine where and when to provide a virtual image to the user and send instructions accordingly to the head mounted display device of FIG. 4.

Some of the components of FIG. 4 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, the components of control circuit 200 are in communication with each other via dedicated lines or one or more buses. In another embodiment, the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of nonvolatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to hub computing system 12 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

As noted in the discussion of FIG. 1C, two 3D rays are calculated in one embodiment. The first 3D ray is based on the orientation of the user's head. The second 3D ray may be a stabilized version of the first 3D ray. Also, the amount of stabilization may be inversely proportional to the variance of the motion of the first 3D ray.

FIGS. 6A-6C are diagrams to help illustrate how the interaction ray 66 can be stabilized in a way that is inversely proportional to variance in a first 3D ray, in one embodiment. FIG. 6A shows an example of a first 3D ray 660 for four recent points in time t1-t4. Also depicted is the interaction ray (second 3D ray) 66 for the same four points in time t1-t4. Typically, the variance may be determined for many more recent points in time.

The first 3D ray 660 is represented by the longer rays. Note that the difference in length is merely to be able to distinguish between the first and second rays. This example corresponds to rotation of the object about the z-axis. This results in a component of motion for the 3D vectors in the x-y plane.

When the variance in the angles with respect to rotation about an axis is high, very little or no stabilizing of the interaction ray 66 is applied, in one embodiment. In this example, the variance in the angles of rotation about the z-axis is sufficiently high such that no stabilizing is applied to the motion of the first 3D ray 660 in the x-y plane. Thus, the interaction ray 66 essentially mirrors the first 3D ray 660 for each of the four points in time. For example, the interaction ray 66 closely tracks the first 3D ray 660.

For some embodiments, the motion of the first 3D ray 660 could be considered to be about the z-axis. Thus, this could be considered to be stabilizing the rotation of the 3D ray about the z-axis, at least for some cases. Note that stabilizing is performed separately for rotation about different axes, in one embodiment.

FIGS. 6B and 6C shows an example in which variance of the angle of rotation about an axis is low. Therefore, the amount of stabilizing of the interaction ray 66 is high. FIG. 6B shows a first 3D ray for nine recent points in time. FIG. 6C shows an interaction ray 66 for the same nine points in time. The length of the arrows is used to represent different points in time. The shortest arrows in each diagram is for t1 and the longest for t9. This example corresponds to rotation of the object about the z-axis. In this example, both the first 3D ray 660 and the interaction ray 66 have their origin at the origin of the xyz coordinate system. Note that this may also be true for the example of FIG. 6A.

FIG. 6B shows that the first 3D ray 660 first drifts a little to the right and then drifts back to the left. That is, first there is some clockwise rotation about the z-axis, and then there is some counter-clockwise rotation about the z-axis. However, the variance of the angle of rotation about the z-axis for the recent time period is relatively low compared to the example of FIG. 6A.

FIG. 6C shows the second 3D ray or interaction ray 66 that may result from the low variance in FIG. 6B. In this example, the stabilizing results in the interaction ray 66 being constant (the length of the arrows simply represent later points in time). Thus, if the user's head is moving slightly to the right and then slightly to the left, this could indicate small variance of the angle with respect to rotation about an axis defined by their spine (e.g., z-axis). Applying high stabilizing factor creates stability in the interaction ray 66, despite some motion of the user's head. Therefore, the user has better control over the interaction ray 66. Note that all rays in FIGS. 6A-6C are shown in the x-y plane to simplify the drawings.

Figure 7:
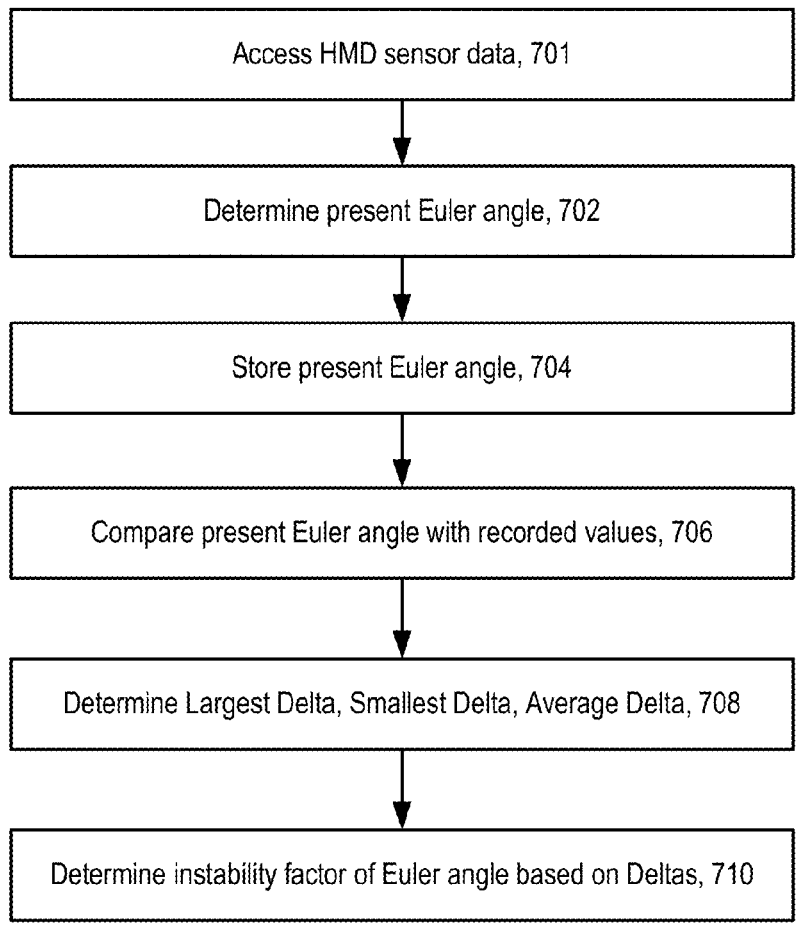
FIG. 7 is a flowchart of one embodiment for determining an instability factor based on variance in an Euler angle.

FIG. 7 is a flowchart of one embodiment for determining an instability factor based on variance in an Euler angle. The instability factor may be used to control motion of the interaction ray 66. Thus, the instability factor may be used to control how closely the interaction ray 66 tracks the first 3D ray. The process may be performed for one of the Euler angles, such as pitch, roll, or yaw. The following discussion could apply to any of the Euler angles. Step 701 is to access HMD sensor data. The use of this data is described below.

In step 702, the present Euler angle is determined. Sensor data from the HMD 2 may be used to help determine the Euler angle. As mentioned above, one possibility is to determine a face unit vector by defining a plane of the user's face, and taking a vector perpendicular to that plane. The face vector may be referred to as an x-vector, with reference to the HMD-coordinate system of FIG. 1A. Furthermore, it is possible to determine head vectors (or axes) in the z-direction and the y-direction. For example, the y-direction head vector could roughly connect the person's ears. For example, the z-direction head vector could roughly start at the middle of the person's head and be perpendicular to the other two head vectors. Other possibilities exist. Theses head vectors may be identified from the camera image data returned from the cameras 112 on head mounted display device 2. In particular, based on what the cameras 112 on head mounted display device 2 see, the associated processing unit 4 is able to determine the head vectors representing a user's head orientation.

Note that the position and orientation of a user's head may also or alternatively be determined from analysis of the position and orientation of the user's head from an earlier time (either earlier in the frame or from a prior frame), and then using the inertial information from the IMU 132 to update the position and orientation of a user's head. Information from the IMU 132 may provide accurate kinematic data for a user's head, but the IMU typically does not provide absolute position information regarding a user's head. This absolute position information, also referred to as "ground truth," may be provided from the image data obtained from cameras on the head mounted display device 2 for the subject user and/or from the head mounted display device(s) 2 of other users.

The Euler angle may be determined in reference to the HMD-based coordinate space (see FIG. 1A, 1B). Note that origin of the HMD-based coordinate space could be somewhere in the person's head. Thus, Euler angles may represent rotations of the head about the axes of the HMD-based coordinate space. For example, the angles may represent a rotation of the head about the x-axis by an angle $\alpha$, a rotation of the head about the y-axis by an angle $\beta$, and a rotation of the head about the z-axis, by an angle $\gamma$. Note that it is not required that all of the angles be determined.

In step 704, the present Euler angle is recorded. Note that Euler angles for previous times are presumed to have been previously recorded. As one example, Euler angles for the last second may be stored. Note that step 704 may discard older values, such that only the most recent Euler angle are recorded. The sampling rate could range considerably, depending on the application and considerations such as computational time available, as well as desired accuracy.

In step 706, the present Euler angle is compared with the stored values to determine how much the Euler angle has changed or varied over the recent time period.

In step 708, the variance of the Euler angle over the recent time period is characterized. In one embodiment, the largest delta, the smallest delta, and the mean delta are determined. The largest delta refers to the largest difference between the present Euler angle and one of the recorded values. The smallest delta refers to the smallest difference between the present Euler angle and one of the recorded values. The mean delta refers to the average difference between the present Euler angle and each of the recorded values. Thus, the variance may be relative to the present Euler angle, but other possibilities exist.

Other measures could be used to characterize the variance of the Euler angle over the recent time period. As noted above, the variance of the Euler angle over time could be calculated as the mathematical variance. However, the term variance as it is used in step 708 is not limited to a strict mathematical definition of variance.

In step 710, an instability factor is determined for the Euler angle. This instability factor may be for the recent time period for which the Euler angles are recorded, as discussed above. In one embodiment, the instability factor is based on a mean average of the differences between the Euler angle for the present time and the Euler angles with respect to rotation about the axis of the head over the recent time period.

In one embodiment, step 710 calculates the difference between the largest delta and the smallest delta from step 708. This is referred to as the delta variance. An instability factor is then determined in accordance to Equation 1:

$$\text{Instability} = (\text{DeltaVar} * \text{VarWeight}) + (\text{DeltaMean} * \text{MeanWeight}) \quad (1)$$

In Equation 1, DeltaVar refers to the difference between the largest delta and the smallest delta, and VarWeight refers to a weighting factor. DeltaMean refers to the mean delta determined in step 708, and MeanWeight refers to a weighting factor. Suitable values for VarWeight and MeanWeight may be determined empirically. The example of Equation 1 is just one example of many possibilities.

There are many variations to the process of FIG. 7. In one embodiment, step 706 is modified by comparing a fixed value for the Euler angle with the recorded values, as opposed to comparing the present value of the Euler angle with the recorded values for the recent time period.

Figure 8:
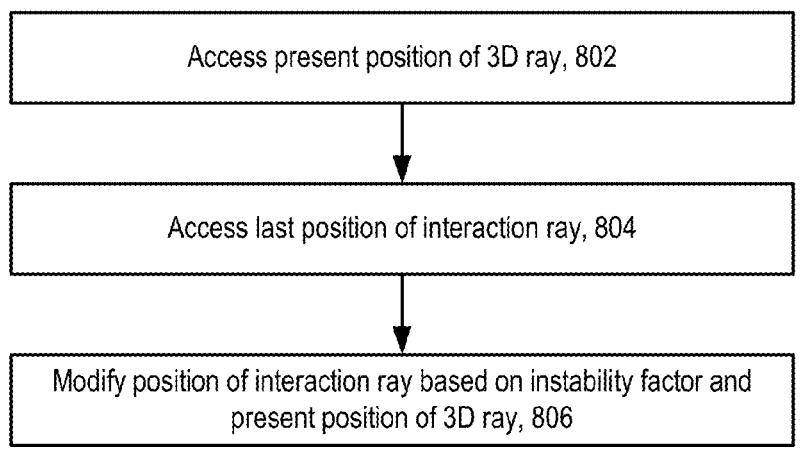
FIG. 8 is a flowchart of one embodiment of a process of applying an instability factor to determine a new interaction ray.

After the instability factor is determined, it may be applied to the interaction ray 66 to stabilize it. FIG. 8 is a flowchart of one embodiment of a process of applying an instability factor to determine a new interaction ray 66. Step 802 is to access a present position of the 3D ray. This may include an origin and direction for the first 3D ray. The 3D ray may be a 3D vector having an origin at, for example, the origin of the HMD-based coordinate system.

Step 804 is to access the more recent (or last) position of the interaction ray 66. This may include an origin and direction for the interaction ray. The interaction ray 66 may have the same origin as the first 3D ray, but that is not required. The interaction ray 66 may be a 3D vector having an origin at, for example, the origin of the HMD-based coordinate system.

Step 906 is to modify the position of the interaction ray 66 based on the present position of the 3D ray and the instability factor. In one embodiment, the system alters how closely the interaction ray 66 tracks the 3D ray based on the variance of the Euler angle over time, the closeness of the tracking being inversely proportional to the variance of the Euler angle.

In one embodiment, the system stabilizes the interaction ray 66 when the instability factor indicates that the Euler angle is relatively stable, but allows the interaction ray 66 to freely track the 3D ray when the instability factor indicates that the Euler angle is relatively instable.

Figure 9:
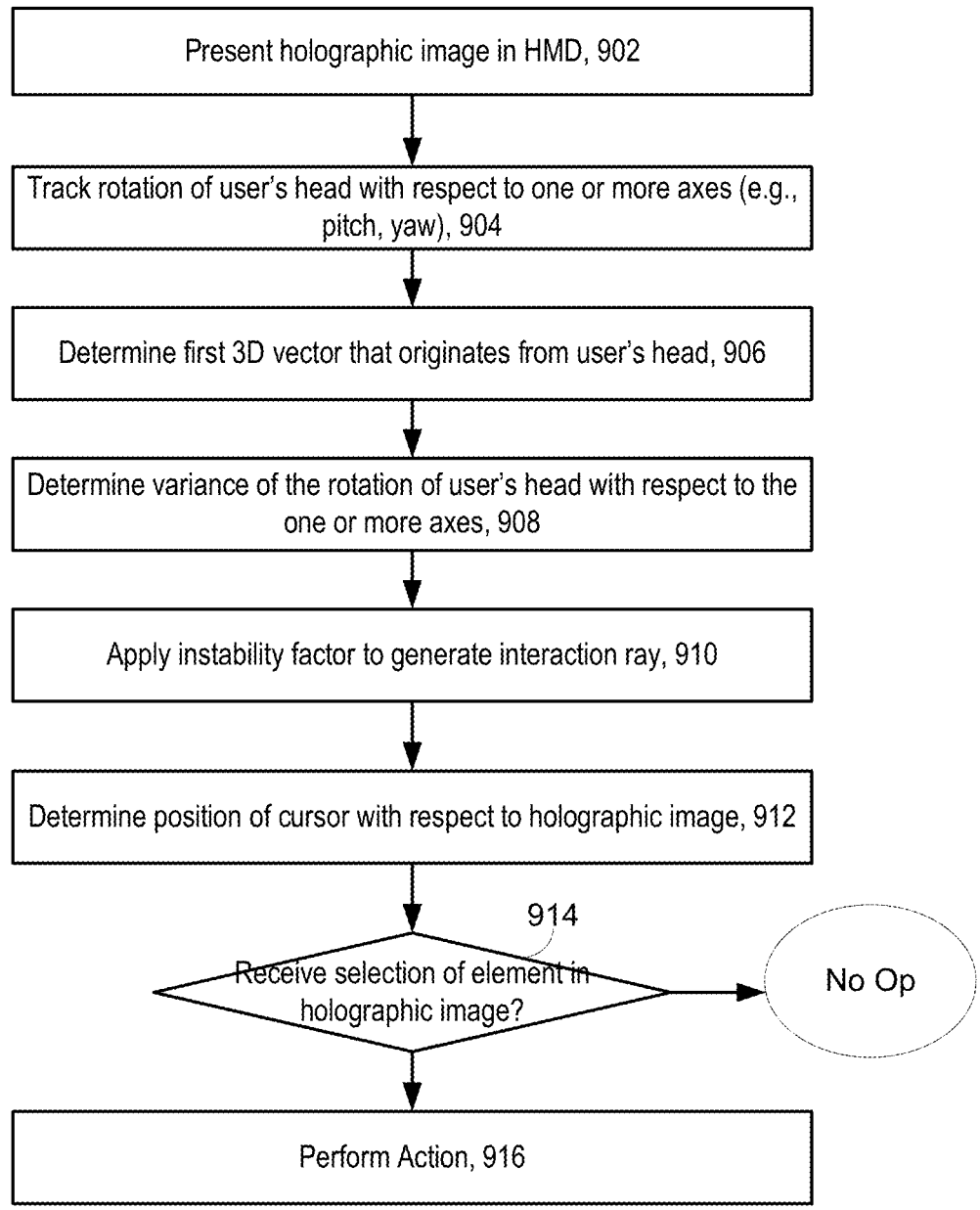
FIG. 9 is a flowchart of one embodiment in which a head curser is stabilized based on variance of angle of rotation of the person's head.

FIG. 9 is a flowchart of one embodiment in which a head curser is stabilized based on variance of angle of rotation of the user's head.

In step 902, a holographic image is presented in an HMD 2. As one example to help illustrate, a newspaper article is displayed. In one embodiment, the holographic image is kept is place in the real world to help the user interact with it. For example, the holographic image is made to appear as if it is on a table or wall. Of course, the user could move the holographic image if desired.

In step 904, rotation of a user's head is tracked with respect to one or more axes. These axes are defined relative to the head itself, in one embodiment. Step 904 may include tracking pitch and yaw, as examples. In one embodiment, the z-axis corresponds roughly to line through the skull that is an extension of the user's spine. Thus, rotation about the z-axis corresponds to the user rotating their head such that they look left or right. This may be referred to as yaw.

In one embodiment, the y-axis corresponds roughly to a line that connects the user's ears. Thus, rotation about the y-axis corresponds to the user moving their head up and down such as a nodding motion. This may be referred to as pitch.

It is also possible to track rotation about an x-axis. In this example, the x-axis may correspond roughly to interaction ray 66. In an application such as a cursor, tracking this rotation about the x-axis might not be needed.

In step 904, the position and orientation of a user's head may be determined, at least in part based on a camera image data returned from the cameras 112 on head mounted display device 2.

In step 906, a first 3D vector 660 is determined based on the orientation of the user's head. In one embodiment, the origin is at a point midway between the user's eyes. The vector extends "straight out" from the user's face in the direction in which they are facing. One possibility is for this to be the x-axis previously mentioned. One possibility is to define a plane for the user's face and project a line perpendicular to that face plane. This face plane may be identified by determining a position of a user's eyes, nose, mouth, ears or other facial features. The face plane may be identified from the camera image data returned from the cameras 112 on head mounted display device 2.

In step 908, the system determines variance of rotation of the user's head about one or more of the axes.

In step 910, the instability factor is used to generate the interaction ray 66. In one embodiment, the process of FIG. 8 is used. Thus, the interaction ray 66 may be generated by stabilizing motion of the first 3D vector 660. The amount of dampening is inversely proportional to the variance of rotation of the user's head, in one embodiment. A separate amount of stabilization may be applied for each axis. As one example, a first amount of stabilization is applied for pitch and a second amount of stabilization is applied for yaw.

In step 912, the position of the interaction ray 66 is determined with respect to the holographic image 60. The system (e.g., HMD 2) may determine or otherwise access the apparent x, y and z positions of all elements in the virtual image at the current time. By "apparent" x, y, and z position it is meant the position in the real world at which the image appears to be. The system can determine whether the interaction ray (e.g., a second 3D vector) 66 intersects any point in the virtual image.

In step 914, the system determines whether a selection of an element that the interaction ray 66 is colliding with is received. The selection could be a voice command, etc.

In step 916, the system takes some action in response to the selection. The action might be to response to selection of a hyperlink, a menu selection, etc. The system might highlight the selected element. The selection might be the user manipulating virtual controls on the virtual image to pause, rewind, fast-forward, change the volume or change the content of a displayed video. Many other possibilities exist.

Other variations are possible of the process of FIG. 9. For example, rather than have the interaction ray 66 be a cursor, the interaction ray 66 might be a pointer. This pointer might be used to point at an object in the real world instead of an element in a holographic image.

Note that in the foregoing example, pitch, roll, and yaw were used. The rotation about an axis of the head could be a rotation about an axis other than pitch, roll, or yaw.

In one embodiment, stabilizing is provided for translation of the head. This stabilizing may be in addition to stabilizing based on rotation of the head. Translation of the head could potentially cause motion in the interaction ray 66. One example is that breathing might cause an up and down motion that is not necessarily reflected in rotation about an axis.

Figure 10:
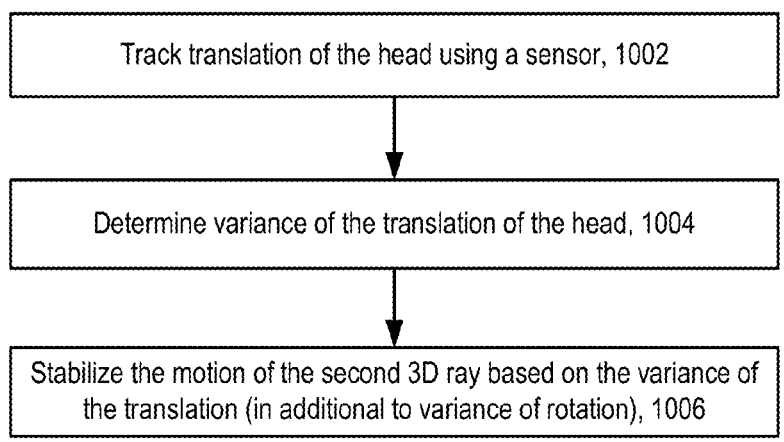
FIG. 10 is a flowchart of one embodiment in which stabilizing is provided for variance of translation of the person's head.

FIG. 10 is a flowchart of one embodiment in which stabilizing is provided for variance of translation of the user's head. Translation involves movement of the origin of the HMD-based coordinate system in one embodiment. Note that the virtual image in the HMD 2 does not necessarily move when the user's head translates. One possible reason for this is that the virtual image can be fixed in place in the real world, such as by making it appear to be on a desk or wall.

In step 1002, translation of the head is tracked using a sensor. This could be based on any of the sensors in the HMD 2. Note that translation of the head might cause movement in the first 3D ray 660. As one example, the origin of the first 3D ray could move. Moving the origin of the first 3D ray might cause the entire ray to move a similar amount. For example, when the origin moves up 3 centimeters, the entire 3D ray might move up 3 centimeters, depending on how the 3D ray is formed. Although possibilities exist.

Step 1002, may include recording recent values for a position of the original of the HMD-based coordinate system. This, in turn, may be determined based on the position of the user's head. In one embodiment, the position of the user's head is determined by determining the 3D position of the HMD 2. This could be based on any of the sensors in the HMD 2, of even sensors outside of the HMD such as a camera. Note that more than one sensor could be used, such as using IMU to determine changes in the position of the HMD 2.

In step 1004, variance of the translation of the head is determined. In step 1006, motion of the first 3D ray 660 that is due to the translation is stabilized. The stabilization may be inversely proportional to the variance of the translation of the head, in one embodiment.

Step 1006, may include determining a stabilization factor based just on the variance of the translation of the object. A separate stabilization factor may be determined for whatever axes are being analyzed, as previously described. All of the various stabilization factors can be applied to the interaction ray 66.

Figure 11:
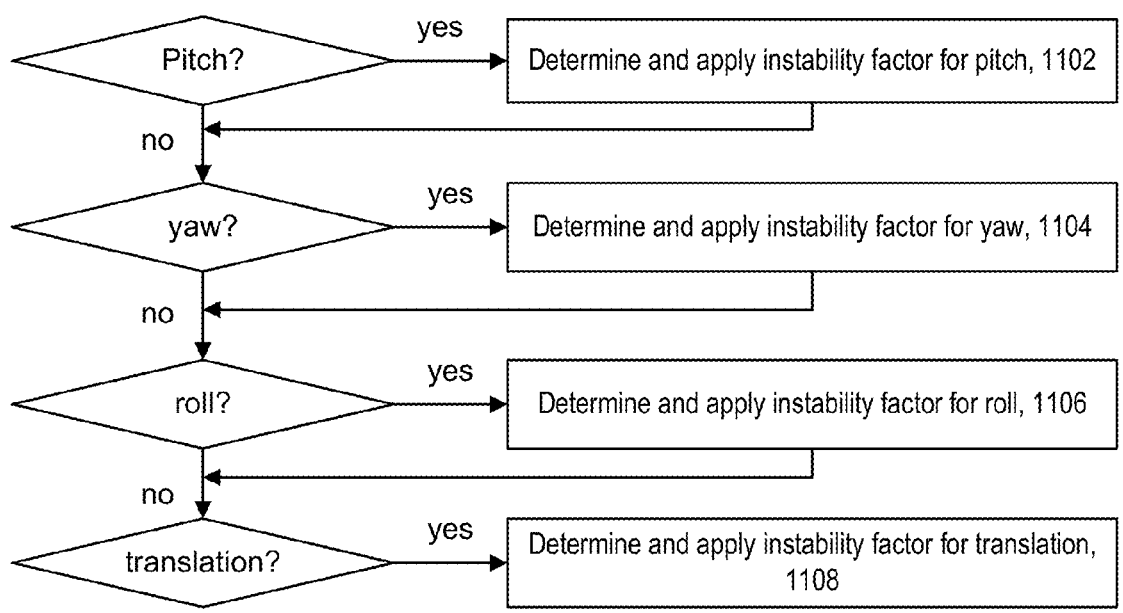
FIG. 11 is a flowchart showing that many combination of the stabilization factors can be applied to the interaction ray.

In general, any combination of the stabilization factors can be applied to the interaction ray 66. FIG. 11 is a flowchart showing that many combination of the stabilization factors can be applied to the interaction ray 66. If stabilization for variance in pitch is to be applied, then an instability factor for variance in pitch is determined and applied in step 1102. In one embodiment, the first 3D ray is a vector that has an origin (e.g., at the origin of the HMD-based coordinate system). The first 3D ray may be characterized by pitch and yaw, and roll with respect to, for example, the HMD-based coordinate system. The second 3D ray may also be a vector that has an origin (e.g., at the origin of the HMD-based coordinate system). The second 3D ray may also be characterized by pitch, yaw, and roll with respect to, for example, the HMD-based coordinate system. Step 1102 may control how closely the pitch of second 3D vector track the pitch of the first 3D vector based on variance in the pitch of the head. Stated another way, step 1102 may control how closely the pitch of second 3D vector tracks the pitch of the first 3D vector based on variance in the pitch of the first 3D vector.

If stabilization for variance in yaw is to be applied, then an instability factor for variance in yaw is determined and applied in step 1104. Step 1104 may control how closely the yaw of second 3D vector tracks the yaw of the first 3D vector based on variance in the yaw of the head. Stated another way, step 1104 may control how closely the yaw of second 3D vector tracks the yaw of the first 3D vector based on variance in the yaw of the first 3D vector.

If stabilization for variance in roll is to be applied, then an instability factor for variance in roll is determined and applied in step 1106. In one embodiment, the first 3D vector has a roll component associated with it. This roll component is in addition to the origin and direction of the 3D vector. Step 1106 may control how closely roll of second 3D vector tracks the roll of the first 3D vector based on variance in the roll of the head. Stated another way, step 1106 may control how closely the roll of second 3D vector tracks the roll of the first 3D vector based on variance in the roll of the first 3D vector.

If stabilization for variance in translation of the head is to be applied, then an instability factor for variance in translation is determined and applied in step 1108. Step 1108 may control how closely the origin of second 3D vector tracks the origin of the first 3D vector based on variance in the translation of the head.

In one embodiment, at least one of steps 1102, 1104, or 1106 is applied. In one embodiment, at least one of steps 1102 or 1104 is applied. However, any combination of steps 1102, 1104, 1106, and 1108 are possible.

Aspects of the present disclosure are described herein with reference to flowchart illustrations, sequence diagrams and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Similarly, each arrow of a sequence diagram may likewise be implemented by computer program instructions. These computer program instructions may be provided to a processor of a general purpose computer (or computing device), special purpose computer, or other programmable data processing apparatus to produce a machine, such that the instructions, which execute via the processor of the computer or other programmable instruction execution apparatus, create a mechanism for implementing the functions/acts specified in the flowchart, sequence diagram and/or block diagram block or blocks.

The storage device and working memory are examples of tangible, non-transitory computer- or processor-readable storage devices. Storage devices include volatile and non-volatile, removable and non-removable devices implemented in any method or technology for storage of information such as computer readable instructions, data structures, program modules or other data. Computer storage devices include RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can accessed by a computer. Computer storage devices do not include propagated signals.

Some embodiments have been described herein as being implanted as instructions performed by a processor. Alternatively, or in addition, embodiments described herein can be performed, at least in part, by one or more hardware logic components. For example, and without limitation, illustrative types of hardware logic components that can be used include Field-programmable Gate Arrays (FPGAs), Application-Specific Integrated Circuits (ASICs), Application-specific Standard Products (ASSPs), System-on-a-Chip systems (SoCs), Complex Programmable Logic Devices (CPLDs), etc.

One embodiment disclosed herein includes apparatus comprising a sensor and logic that monitors orientation of a person's head using the sensor, including monitoring rotation about an axis of the head, including recording an Euler angle with respect to rotation about the axis of the head. The logic determines a three-dimensional (3D) ray based on the orientation of the head. The 3D ray has a motion that may precisely tracks the Euler angle over time. The logic generates an interaction ray that tracks the 3D ray to some extent. The logic determines a variance of the Euler angle over a recent time period. The logic stabilizes the interaction ray based on the variance of the Euler angle over the recent time period despite some rotation about the axis of the head. An amount of stabilizing may be inversely proportional to the variance of the Euler angle. The logic determines a collision of the interaction ray with a 3D coordinate.

The apparatus of the above paragraph may further comprise a near-eye, see-through display. The logic may present a holographic image on the near-eye, see-through display, the logic determines a collision of the interaction ray with respect to the holographic image.

In one embodiment of the apparatus of either of the two preceding paragraphs, the 3D ray is a first 3D vector that originates from the head and the interaction ray is a second 3D vector that originates from the head.

In one embodiment of the apparatus of either of the three preceding paragraphs calculates an instability factor for the Euler angle over the recent time period. The instability factor may be a function of differences between an Euler angle for the present time and the Euler angle with respect to rotation about the axis of the head for different points in time over the recent time period. The logic modifies the interaction ray based on the instability factor and a present position of the 3D ray. The interaction ray may be stabilized when the variance of the Euler angle over the recent time period is low despite some motion of the head about the axis. The interaction ray closely tracks the 3D ray when the variance of the Euler angle over the recent time period is high. In one embodiment, the instability factor is based on a mean average of the differences between the Euler angle for the present time and the Euler angles with respect to rotation about the axis of the head over the recent time period.

In one embodiment of the apparatus of the preceding paragraphs, the first Euler angle tracks pitch of the head and the second Euler angle tracks yaw of the head.

In one embodiment of the apparatus of the preceding paragraphs the logic further tracks translation of the person's head. The logic determines a variance of the translation of the head over the recent time period. The logic may alter how closely the interaction ray tracks the 3D ray based on the variance of the Euler angle over the recent time period and the variance of the translation of the head over the recent time period. The logic may stabilize the interaction ray based on the variance of the translation of the head over the recent time period despite some translation of the head during the recent time period.

One embodiment includes method comprising the following. Head orientation is tracked using a sensor, including tracking rotation about an axis of the head. Values for an angle of rotation about the axis of the head over a recent time interval are recorded. A first three-dimensional (3D) ray based on actual orientation of the head is determined. The first 3D ray has a motion that tracks the actual orientation of the head over time. The first 3D ray has a direct correspondence of the rotation about the axis of the head. A variance of the recorded angle over the recent time interval is determined. A second 3D ray is determined based on actual position of the first 3D ray and the variance of the recorded angle over the recent time interval. This may include stabilizing motion of the second 3D ray to a degree that is inversely proportional to the variance. A collision of the second 3D ray with a 3D coordinate is determined.

One embodiment includes an apparatus comprising a sensor; a see-through, near-eye display; processor readable storage having instructions stored thereon; and a processor coupled to the sensor, the processor readable storage, and the see-through, near-eye display. The instructions which when executed on the processor cause the processor to do the following. The processor presents a holographic image on the near-eye, see-through display. The holographic image may be associated with points in 3D space in a field of view of the see-through, near-eye display. The processor accesses data from the sensor. The processor tracks head orientation using the sensor data, and tracks pitch and yaw of the head orientation. The processor determines a first variance in the pitch over time and a second variance in the yaw over time. The processor determines a first 3D vector based on the head orientation. The first 3D vector has an origin at a point on the head. The first 3D vector has a pitch and a yaw that track the pitch and a yaw of the head over time. The processor generates a second 3D vector that has a pitch and a yaw that tracks the first 3D vector. The processor controls how closely the pitch and the yaw of second 3D vector track the pitch and the yaw of the first 3D vector based on the first variance in the pitch of the head and the second variance in the yaw of the head. The processor tracks the pitch of the second 3D vector proportional to the first variance and stabilizes the pitch of the second 3D vector inversely proportional to the first variance. The processor tracks the yaw of the second 3D vector proportional to the second variance and stabilizes the yaw of the second 3D vector inversely proportional to the second variance. The processor determines a collision of the second 3D vector with a 3D point that is associated with the holographic image.

Support should also be provided for multiple dependent claims by providing the equivalent description in this section, for example, by stating that the embodiment described in the previous paragraph may also be combined with one or more of the specifically disclosed alternatives Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. An apparatus comprising:
    a sensor; and
    logic that monitors orientation of a person's head using the sensor, including monitoring rotation about an axis of the head, including recording an Euler angle with respect to rotation about the axis of the head;
    the logic configured to determine a three-dimensional (3D) ray based on the orientation of the head, the 3D ray has a motion that precisely tracks the Euler angle over time;
    the logic configured to generate an interaction ray that tracks the 3D ray to some extent;
    the logic configured to determine a variance of the Euler angle over a recent time period, the variance being based on differences between an Euler angle for the present time and the Euler angle with respect to rotation about the axis of the head for different points in time over the recent time period;
    the logic configured to stabilize the interaction ray based on the variance of the Euler angle over the recent time period despite some rotation about the axis of the head, an amount of stabilizing being inversely proportional to the variance of the Euler angle; and the logic configured to determine a collision of the interaction ray with a 3D coordinate.

2. The apparatus of claim 1, further comprising:
a near-eye, see-through display;
wherein the logic is configured to present a holographic image on the near-eye, see-through display, the logic is configured to determine a collision of the interaction ray with respect to the holographic image.

3. The apparatus of claim 2, wherein the 3D ray is a first 3D vector that originates from the head, the interaction ray is a second 3D vector that originates from the head.

4. The apparatus of claim 1, wherein the logic is configured to:
modify the interaction ray based on the variance and a present position of the 3D ray, wherein the interaction ray is stabilized when the variance of the Euler angle over the recent time period is low despite some motion of the head about the axis, the interaction ray closely tracks the 3D ray when the variance of the Euler angle over the recent time period is high.

5. The apparatus of claim 4, wherein the variance is based on a mean average of the differences between the Euler angle for the present time and the Euler angles with respect to rotation about the axis of the head over the recent time period.

6. The apparatus of claim 1, wherein when the logic is configured to monitor orientation of a person's head using the sensor, determine variance of the Euler angle over the recent time period, and stabilize the interaction ray based on the variance of the Euler angle, the logic is configured to:
track a first rotation about a first axis of the head to determine a first Euler angle;
track a second rotation about a second axis of the head to determine a second Euler angle;
determine a first variance of the first Euler angle over the recent time period;
determine a second variance of the second Euler angle over the recent time period;
track the interaction ray tracks to the 3D ray with respect to the first axis to a degree that is proportional to the first variance of the first Euler angle over the recent time period and stabilizes the interaction ray tracks inversely proportional to the first variance of the first Euler angle over the recent time period; and
track the interaction ray tracks to the 3D ray with respect to the second axis to a degree that is proportional to the second variance of the second Euler angle over the recent time period and stabilizes the interaction ray tracks inversely proportional to the second variance of the second Euler angle over the recent time period.

7. The apparatus of claim 6, wherein the first Euler angle tracks pitch of the head and the second Euler angle tracks yaw of the head.

8. The apparatus of claim 1, wherein the logic is further configured to:
track translation of the person's head; and
determine a variance of the translation of the head over the recent time period;
wherein the logic is configured to alter how closely the interaction ray tracks the 3D ray based on the variance of the Euler angle over the recent time period and the variance of the translation of the head over the recent time period, the logic is configured to stabilize the interaction ray based on the variance of the translation of the head over the recent time period despite some translation of the head during the recent time period.

9. The apparatus of claim 1, wherein the variance is a mathematical variance.

10. The apparatus of claim 1, wherein the logic is further configured to determine a largest difference between the present Euler angle and the Euler angles for the recent time period and a smallest difference between the present Euler angle and the Euler angles for the recent time period, the logic is configured to determine the variance of the Euler angle over the recent time period further based on the difference between the largest difference and the smallest difference.

11. A method comprising:
tracking head orientation using a sensor, including tracking rotation about an axis of the head;
recording values for an angle of rotation about the axis of the head over a recent time interval;
determining a first three-dimensional (3D) ray based on actual orientation of the head, the first 3D ray has a motion that tracks the actual orientation of the head over time, the first 3D ray has a direct correspondence of the rotation about the axis of the head;
determining a variance of the recorded angle over the recent time interval based on differences between an Euler angle for the present time and the Euler angle with respect to rotation about the axis of the head for different points in time over the recent time interval;
generating a second 3D ray based on actual position of the first 3D ray and the variance of the recorded angle over the recent time interval, including stabilizing motion of the second 3D ray to a degree that is inversely proportional to the variance; and
determining a collision of the second 3D ray with a 3D coordinate.

12. The method of claim 11, wherein the tracking orientation of a head includes:
tracking pitch and yaw of the head orientation, the first 3D ray is a first 3D vector that originates from the head, the second 3D ray is a second 3D vector that originates from the head.

13. The method of claim 11, further comprising:
presenting a holographic image in a head mounted display, the holographic image comprising 3D objects, the determining a collision of the second 3D ray with a 3D coordinate includes determining a collision of the second 3D ray with a first 3D object of the 3D objects.

14. The method of claim 13, wherein the second 3D ray is a cursor, further comprising:
receiving a selection of the first 3D object.

15. The method of claim 11, wherein the tracking rotation about an axis of the head, the determining variance of the recorded angle over the recent time interval, and the stabilizing motion of the second 3D ray to a degree that is inversely proportional to the variance includes:
tracking a first rotation about a first axis of the head;
recording values for a first angle of rotation about the first axis over the recent time interval;
tracking a second rotation about a second axis of the head;
recording values for a second angle of rotation about the second axis over the recent time interval;
determining a first variance of the recorded first angle over the recent time interval;
determining a second variance of the recorded second angle over the recent time interval; and
stabilizing the motion of the second 3D ray to a degree that is inversely proportional to the first variance and the second variance.

16. The method of claim 15, wherein the tracking rotation about an axis of the head, the determining a variance of the recorded angle over the recent time interval, and the stabilizing motion of the second 3D ray to a degree that is inversely proportional to the variance includes:
- tracking a third rotation about a third axis of the head;
- recording values for a third angle of rotation about the third axis over the recent time interval;
- determining a third variance of the recorded third angle over the recent time interval; and
- stabilizing motion of the second 3D ray to a degree that is inversely proportional to the first variance, the second variance, and the third variance.

17. The method of claim 11, further comprising:
- tracking translation of the head; and
- determining a variance of the translation of the head over the recent time interval, the stabilizing motion of the second 3D ray is further based on the variance of the translation of the head, the stabilizing being inversely proportional to the variance of the translation of the head over recent time interval.

18. An apparatus comprising:
- a sensor;
- a see-through, near-eye display;
- processor readable storage having instructions stored thereon; and
- a processor coupled to the sensor, the processor readable storage, and the see-through, near-eye display, the instructions which when executed on the processor cause the processor to:
  - present a holographic image on the see-through, near-eye display, the holographic image being associated with points in 3D space in a field of view of the see-through, near-eye display;
  - access data from the sensor;
  - track head orientation using the sensor data, the instruction cause the processor to track pitch and yaw of the head orientation;
  - determine a first variance in the pitch over a recent time period and a second variance in the yaw over the recent time period, comprising determining the first variance based on differences between the pitch for the present time and the pitch for different points in time over the recent time period and determining the second variance based on differences between the yaw for the present time and the yaw for different points in time over the recent time period;
  - determine a first 3D vector based on the head orientation, the first 3D vector having an origin at a point on the head, the first 3D vector has a pitch and a yaw that track the pitch and a yaw of the head over time;
  - generate a second 3D vector that has a pitch and a yaw that tracks the first 3D vector;
  - control how closely the pitch and the yaw of second 3D vector track the pitch and the yaw of the first 3D vector based on the first variance in the pitch of the head and the second variance in the yaw of the head, the instruction cause the processor to track the pitch of the second 3D vector proportional to the first variance and stabilizes the pitch of the second 3D vector inversely proportional to the first variance, the instruction cause the processor to track the yaw of the second 3D vector proportional to the second variance and stabilizes the yaw of the second 3D vector inversely proportional to the second variance; and
  - determine a collision of the second 3D vector with a 3D point that is associated with the holographic image.

19. The apparatus of claim 18, wherein the second 3D vector has an origin, the instructions cause the processor to:
- track translation of the head; and
- determine a variance of the translation of the head over time;
- control how closely the origin of the second 3D vector tracks an origin of the first 3D vector based on the variance of the translation of the head, the origin of the second 3D vector tracks the origin of the first 3D vector more closely when the variance of the translation of the head is high than when the variance of the translation of the head is low.

20. The apparatus of claim 18, wherein the instructions further cause the processor to:
- calculate a first instability factor for the pitch of the head based on the first variance and a second instability factor for the yaw of the head based on the second variance;
- stabilizes the second 3D vector with respect to pitch when the first instability factor indicates that the first variance in the pitch of the head is low;
- stabilizes the second 3D vector with respect to yaw when the second instability factor indicates that that the second variance in the yaw of the head is low;
- allows the second 3D vector to freely track the first 3D vector with respect to pitch when the first instability factor indicates that the first variance in the pitch of the head is high; and
- allows the second 3D vector to freely track the first 3D vector with respect to yaw when the second instability factor indicates that the second variance in the yaw of the head is high.

* * * * *